US012518899B2

(12) United States Patent
Kawakami et al.

(10) Patent No.: US 12,518,899 B2
(45) Date of Patent: Jan. 6, 2026

(54) COIL COMPONENT AND METHOD OF MANUFACTURING THE SAME

(71) Applicant: Murata Manufacturing Co., Ltd., Kyoto-fu (JP)

(72) Inventors: Yuuki Kawakami, Nagaokakyo (JP); Yoshimasa Yoshioka, Nagaokakyo (JP); Ryuichiro Tominaga, Nagaokakyo (JP); Keisuke Kunimori, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 945 days.

(21) Appl. No.: 17/695,727

(22) Filed: Mar. 15, 2022

(65) Prior Publication Data

US 2022/0310293 A1 Sep. 29, 2022

(30) Foreign Application Priority Data

Mar. 23, 2021 (JP) ................................ 2021-048025

(51) Int. Cl.
*H01F 5/00* (2006.01)
*H01F 27/02* (2006.01)
*H01F 27/28* (2006.01)

(52) U.S. Cl.
CPC ............ *H01F 5/00* (2013.01); *H01F 27/022* (2013.01); *H01F 27/2804* (2013.01)

(58) Field of Classification Search
CPC ...................................................... H01F 5/00
USPC ........................................................ 336/200
See application file for complete search history.

(56) References Cited

U.S. PATENT DOCUMENTS

2004/0166370 A1* 8/2004 Mizoguchi .......... H01F 17/0006 428/692.1
2018/0277296 A1* 9/2018 Endo .................... H01F 41/046

FOREIGN PATENT DOCUMENTS

| | | | |
|---|---|---|---|
| CN | 104700981 | A | 6/2015 |
| CN | 110729109 | A | 1/2020 |
| JP | 2009-231656 | A | 10/2009 |
| JP | 2018-170320 | A | 11/2018 |
| JP | 2020-053483 | A | 4/2020 |
| JP | 2021-028944 | A | 2/2021 |
| WO | 2015/133310 | A1 | 9/2015 |

* cited by examiner

*Primary Examiner* — Ronald Hinson
(74) *Attorney, Agent, or Firm* — Studebaker Brackett PLLC

(57) ABSTRACT

A coil component includes a main body having a main surface, an inductor wiring conductor arranged in the main body, and an extended conductor arranged in the main body so as to extend toward the main surface and electrically connected to the inductor wiring conductor. The extended conductor includes an end surface exposed on the main surface of the main body and an extending portion integrally formed with the end surface and arranged so as to extend along and on the main surface.

18 Claims, 8 Drawing Sheets

COIL COMPONENT AND METHOD OF MANUFACTURING THE SAME

CROSS-REFERENCE TO RELATED APPLICATION

This application claims benefit of priority to Japanese Patent Application No. 2021-048025 filed Mar. 23, 2021, the entire content of which is incorporated herein by reference.

BACKGROUND

Technical Field

The present disclosure relates to a coil component in which an inductor wiring conductor is built in a main body and a method of manufacturing the same, and more particularly to an extended structure of the inductor wiring conductor to an external terminal electrode to be provided on a surface of the main body and a method of manufacturing the same.

Background Art

A coil component of interest to this disclosure is described, for example, in International Publication No. 2015/133310.

A coil component described in International Publication No. 2015/133310 includes an inductor wiring conductor to be built in a multilayer substrate. A columnar extended conductor for extending the inductor wiring conductor is provided in the multilayer substrate. Paragraph [0253] of International Publication No. 2015/133310 describes that an end surface of one end portion of the extended conductor may be exposed from the multilayer substrate to function as an external terminal electrode.

SUMMARY

In the coil component described above, when the end surface of the columnar extended conductor in the multilayer substrate is caused to function as an external terminal electrode, the close contact force of the extended conductor to the main body may be insufficient. In addition, the area of the end surface of the columnar extended conductor is relatively small, and the reliability of the fixing strength to the mounting substrate may be poor.

Therefore, the present disclosure provides a structure of a coil component and a method of manufacturing the same, which can solve the above-described problem encountered when an end surface of an extended conductor functions as an external terminal electrode.

A coil component according to an aspect of the present disclosure includes a main body having a main surface, an inductor wiring conductor arranged in the main body, and an extended conductor arranged in the main body so as to extend toward the main surface and electrically connected to the inductor wiring conductor.

In the coil component, the extended conductor includes an end surface exposed on the main surface and an extending portion integrally formed with the end surface and arranged so as to extend along and on the main surface.

A method of manufacturing a coil component according to another aspect of the present disclosure includes preparing a structure which has a main surface, and inside which an inductor wiring conductor and an extended conductor electrically connected to the inductor wiring conductor are arranged, with the extended conductor extending toward the main surface. The method of manufacturing a coil component further includes grinding the structure from the main surface side so as to expose an end surface of the extended conductor on the main surface side, and forming, in the grinding, an extending portion that is integrally formed with the end surface of the extended conductor and extends along and on the main surface after grinding.

According to the above-described coil component, the total surface area of the end surface and the extending portion is larger than the sectional area of the extended conductor in a section extending in a direction parallel to the main surface, and the close contact force of the extended conductor to the main body can be improved.

In addition, since the above-described surface area can be further increased, the reliability of the fixing strength of the coil component to the mounting substrate can be increased.

According to the above-described manufacturing method, reliability can be improved by a simple step.

BRIEF DESCRIPTION OF THE DRAWINGS

FIG. 2A illustrates a section taken along a line A-A of FIG. 1, and FIG. 2B illustrates a section taken along a line B-B of FIG. 1;

DETAILED DESCRIPTION

First Embodiment

Figure 1:
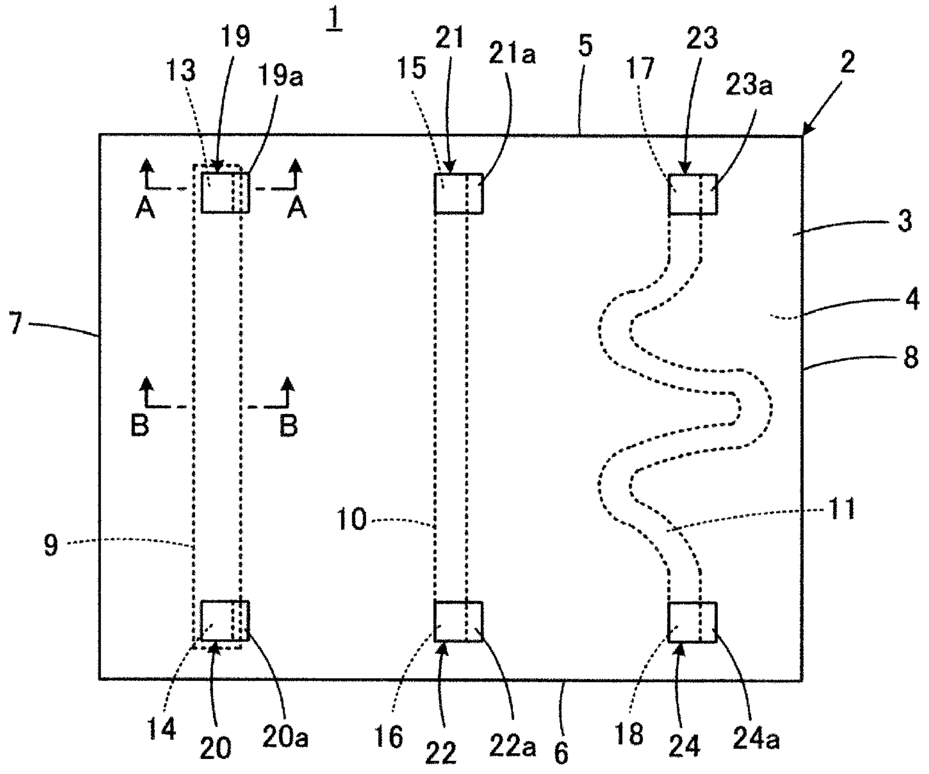
FIG. 1 is a plan view illustrating an appearance of a coil component.

A structure of a coil component 1 according to a first embodiment, which is an aspect of the present disclosure, will be described with reference to FIG. 1 and FIGS. 2A and 2B.

The coil component 1 includes a main body 2 that is preferably formed of a magnetic material. The magnetic material forming the main body 2 is made of, for example, an organic material containing metal magnetic powder. The metal magnetic powder is, for example, a powder having an average particle diameter of equal to or less than 5 μm and made of an alloy containing Fe such as an Fe—Si-based alloy. Note that the metal magnetic powder may be crystalline or amorphous. An oxide magnetic powder such as ferrite may be used instead of the metal magnetic powder. As the organic material, for example, an epoxy resin, a mixture of an epoxy resin and an acrylic resin, or a mixture of an epoxy resin, an acrylic resin, and another resin is used.

The main body 2 has a plate shape or a rectangular parallelepiped shape, and has a first main surface 3 and a second main surface 4 opposed to each other, and four end surfaces 5, 6, 7, and 8 connecting between the first main surface 3 and the second main surface 4. Note that the "main surface" and the "end surface" are names given for convenience of description and are relatively determined.

Three linear inductor wiring conductors 9, 10, and 11 are arranged in the main body 2. The inductor wiring conductors 9, 10, and 11 extend in a direction connecting the opposing end surfaces 5 and 6. The inductor wiring conductors 9 and 10 have a straight shape, and the inductor wiring conductor 11 has a meandering shape. Further, the inductor wiring conductor 9 is thicker than the inductor wiring conductors 10 and 11.

Extended conductors 13 and 14 are provided at one end portion and the other end portion of the inductor wiring conductor 9, respectively. One extended conductor 13 is illustrated in FIG. 2A. Extended conductors 15 and 16 are provided at one end portion and the other end portion of the inductor wiring conductor 10, respectively. Extended conductors 17 and 18 are provided at one end portion and the other end portion of the inductor wiring conductor 11, respectively. As can be seen from the state of the extended conductor 13 illustrated in FIG. 2A, each of the extended conductors 13 to 18 is positioned so as to overlap a corresponding end portion of each of the inductor wiring conductors 9 to 11, and is arranged in the main body 2 so as to extend toward the first main surface 3. Preferably, each of the extended conductors 13 to 18 extends in a direction orthogonal to the first main surface 3.

The inductor wiring conductors 9 to 11 and the extended conductors 13 to 18 may be formed of, for example, Au, Pt, Pd, Ag, Cu, Al, Co, Cr, Zn, Ni, Ti, W, Fe, Sn, or In, or a compound thereof, in particular, are preferably formed of ductile Au, Pt, Ag, or Cu, or a compound thereof, and more preferably formed of Cu or a Cu alloy in view of cost.

Six external terminal electrodes 19 to 24 are provided so as to be exposed on the first main surface 3 of the main body 2. In the above description, the "main surface" and the "end surface" are names given for convenience of description and are relatively determined, however, the "main surface" is defined as a surface on which the external terminal electrodes 19 to 24 are exposed.

One end portion of the inductor wiring conductor 9 is electrically connected to the external terminal electrode 19 via the extended conductor 13, and the other end portion is electrically connected to the external terminal electrode 20 via the extended conductor 14. One end portion of the inductor wiring conductor 10 is electrically connected to the external terminal electrode 21 via the extended conductor 15, and the other end portion is electrically connected to the external terminal electrode 22 via the extended conductor 16. One end portion of the inductor wiring conductor 11 is electrically connected to the external terminal electrode 19 via the extended conductor 17, and the other end portion is electrically connected to the external terminal electrode 20 via the extended conductor 18.

The external terminal electrode 19 includes an end surface of the extended conductor 13 exposed on the first main surface 3 and an extending portion 19*a* that is integrally formed with the end surface and is arranged so as to extend along the first main surface 3. That is, the extended conductor 13 includes the end surface and the extending portion 19*a*. With this configuration, a combined surface area of the end surface of the external terminal electrode 19 and the extending portion 19*a* is larger than a sectional area of the extended conductor 13 in a section extending in a direction parallel to the first main surface 3. In addition, the extending portion 19*a* is located only on one side of the end surface when viewed from the direction orthogonal to the first main surface 3. To be specific, in FIG. 1, the extending portion 19*a* overhangs to the right side of the end surface (in a direction orthogonal to the inductor wiring conductor 9).

The same applies to the other external terminal electrodes 20 to 24, which have extending portions 20*a*, 21*a*, 22*a*, 23*a*, and 24*a*, respectively.

Further, in the coil component 1, as illustrated in FIG. 1, three external terminal electrodes 19, 21, and 23 are arranged along the first main surface 3, and three external terminal electrodes 20, 22, and 24 are arranged along the first main surface 3. The extending portions 19*a*, 21*a*, and

23*a* of the three external terminal electrodes 19, 21, and 23 are located in the same direction to each other with respect to the end surfaces of the extended conductors 13, 15 and 17, respectively, and the extending portions 20*a*, 22*a* and 24*a* of the three external terminal electrodes 20, 22 and 24 are located in the same direction to each other with respect to the end surfaces of the extended conductors 14, 16, and 18, respectively. To be specific, the extending portions 19*a* to 24*a* overhang to the right side of the sheet of FIG. 1 (in a direction orthogonal to the inductor wiring conductors, 9, 10, and 11). Such a configuration is particularly effective when the interval between the plurality of arranged external terminal electrodes is narrow, as in the embodiment illustrated in FIG. 17 described later.

Next, a preferred method of manufacturing the coil component 1 will be described with reference to FIG. 3 to FIG. 15. FIG. 3 to FIG. 15 illustrate a manufacturing method related to a portion where the inductor wiring conductor 9 and the extended conductor 13 illustrated in FIG. 2A are provided. The other extended conductor 14 of the inductor wiring conductor 9, the other inductor wiring conductors 10 and 11, and the portions where the extended conductors 15 to 18 are provided are also subjected to the same steps as those illustrated in FIG. 3 to FIG. 15 for the portions where the inductor wiring conductor 9 and the extended conductor 13 are provided.

Figure 3:
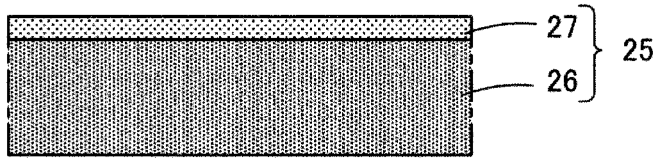
FIG. 3 is a sectional view for explaining a method of manufacturing the coil component illustrated in FIG. 1, and illustrates a part of a support substrate to be prepared.

First, as illustrated in FIG. 3, a support substrate 25 is prepared. The support substrate 25 includes a base portion 26 made of a material having a relatively high flexural strength, such as ceramic, for example, ferrite or alumina, or a cured resin, and a coating portion 27 covering one main surface of the base portion 26 and made of resin, for example, polyimide. The coating portion 27 is formed by, for example, applying resin onto the base portion 26 by spin coating and then curing the resin.

Figure 4:
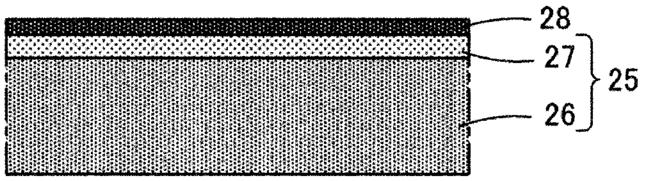
FIG. 4 is a sectional view illustrating a step subsequent to the step illustrated in FIG. 3, and illustrates a state in which a conductive seed layer is formed on the support substrate.

Next, as illustrated in FIG. 4, a conductive seed layer 28 is formed on the support substrate 25. The seed layer 28 is for supplying electric charge when the inductor wiring conductors 9 to 11 are formed by electrolytic plating. The seed layer 28 is preferably made of the same material as that of the inductor wiring conductors 9 to 11, and is made of, for example, Au, Pt, Pd, Ag, Cu, Al, Co, Cr, Zn, Ni, Ti, W, Fe, Sn, or In, or a compound thereof. Electroless plating, sputtering or the like is applied to the formation of the seed layer 28. In addition, the thickness of the seed layer 28 is not particularly limited as long as electric charge can be supplied and the seed layer 28 functions sufficiently in electrolytic plating, but is desirably equal to or less than 2 μm, for example.

Figure 5:
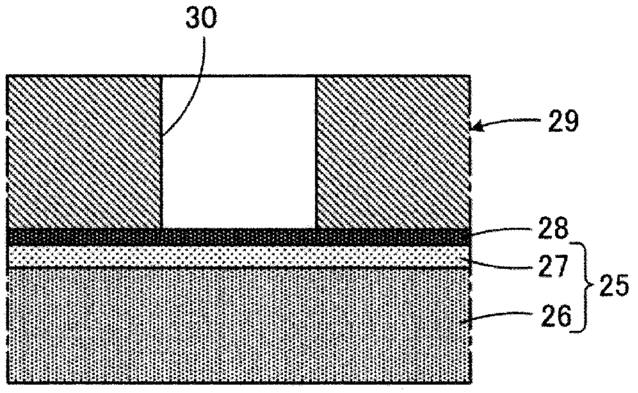
FIG. 5 is a sectional view illustrating a step subsequent to the step illustrated in FIG. 4, and illustrates a state in which a first resist is provided on a seed layer in a portion corresponding to the portion illustrated in FIG. 2A.

Next, as illustrated in FIG. 5, a first resist 29 is provided on the seed layer 28. The first resist 29 has an opening 30 of a pattern corresponding to the pattern of the inductor wiring conductor 9. The first resist 29 is formed of, for example, a dry film resist. More specifically, a dry film resist is laminated on the seed layer 28 while peeling off a protective film, and is patterned through each of exposure, development, and curing steps to form the first resist 29 having the opening 30.

Figure 6:
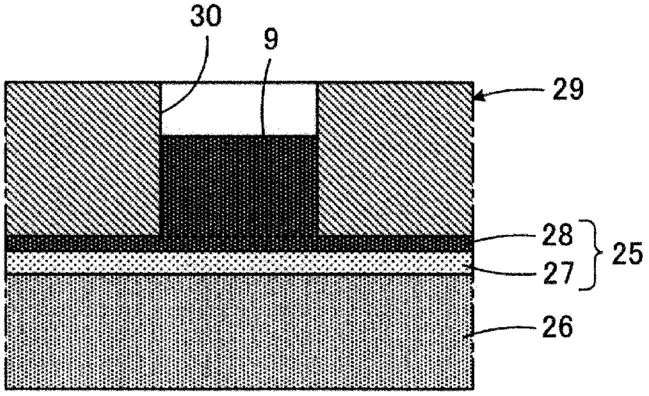
FIG. 6 is a sectional view illustrating a step subsequent to the step illustrated in FIG. 5, and illustrates a state in which an inductor wiring conductor is formed on the seed layer through an opening of the first resist by electrolytic plating in a portion corresponding to the portion illustrated in FIG. 2A.

Next, as illustrated in FIG. 6, the inductor wiring conductor 9 is formed by electrolytic plating of a conductive metal such as Cu. The conductive metal to be the inductor wiring conductor 9 is plated and grown on the seed layer 28 to which the electric charge is supplied through the opening 30 of the first resist 29, and becomes the inductor wiring conductor 9. When the seed layer 28 is made of the same material as that of the inductor wiring conductor 9, the inductor wiring conductor 9 is integrated with the seed layer 28.

Figure 7:
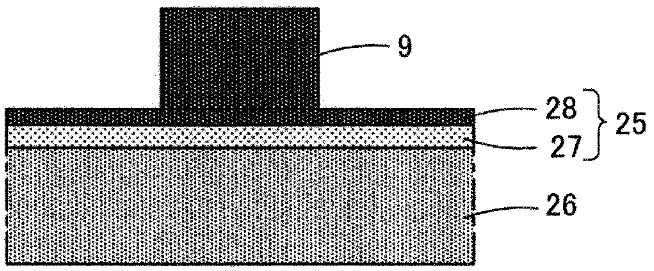
FIG. 7 is a sectional view illustrating a step subsequent to the step illustrated in FIG. 6, and illustrates a state in which the first resist is removed in a portion corresponding to the portion illustrated in FIG. 2A.

Next, as illustrated in FIG. 7, the first resist 29 is peeled and removed.

Figure 8:
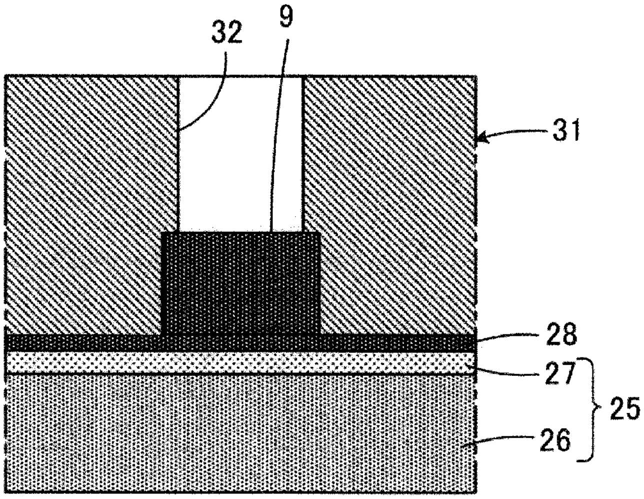
FIG. 8 is a sectional view illustrating a step subsequent to the step illustrated in FIG. 7, and illustrates a state in which a second resist is provided on the seed layer in a portion corresponding to the portion illustrated in FIG. 2A.

Next, as illustrated in FIG. 8, a second resist 31 is provided on the seed layer 28. In a portion corresponding to the portion illustrated in FIG. 2A, the second resist 31 has an opening 32 of a pattern corresponding to the pattern of the extended conductor 13 electrically connected to the end portion of the inductor wiring conductor 9. The second resist 31 is formed of, for example, a dry film resist. More specifically, as in the case of the first resist 29, a dry film resist is laminated on the seed layer 28 while the protective film is peeled off, and is patterned through each of exposure, development, and curing steps to form the second resist 31 having the opening 32.

Figure 9:
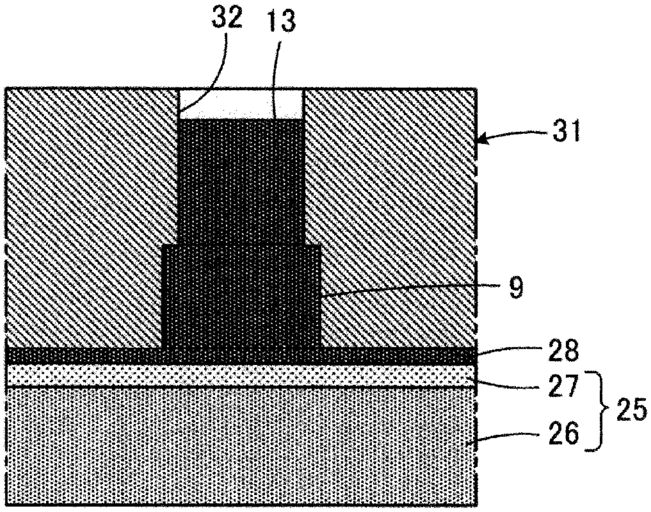
FIG. 9 is a sectional view illustrating a step subsequent to the step illustrated in FIG. 8, and illustrates a state in which an extended conductor is formed on an end portion of the inductor wiring conductor through an opening of the second resist by electrolytic plating in a portion corresponding to the portion illustrated in FIG. 2A.

Next, as illustrated in FIG. 9, electrolytic plating of a conductive metal such as Cu is performed. At this time, in a portion corresponding to the portion illustrated in FIG. 2A, the extended conductor 13 is formed on the end portion of the inductor wiring conductor 9 through the opening 32 of the second resist 31 by electrolytic plating. The extended conductor 13 is preferably made of the same material as that of the inductor wiring conductor 9.

Figure 10:
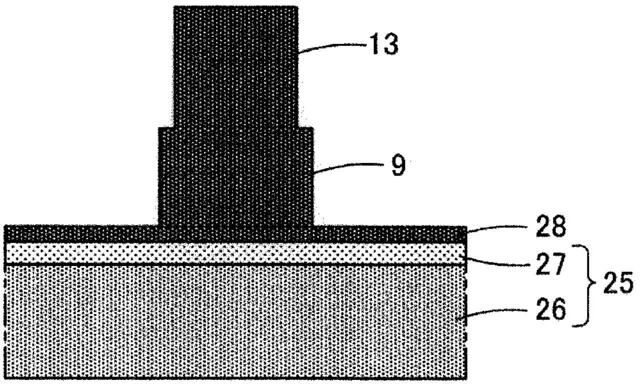
FIG. 10 is a sectional view illustrating a step subsequent to the step illustrated in FIG. 9, and illustrates a state in which the second resist is removed in a portion corresponding to the portion illustrated in FIG. 2A.

Next, as illustrated in FIG. 10, the second resist 31 is peeled and removed.

Figure 11:
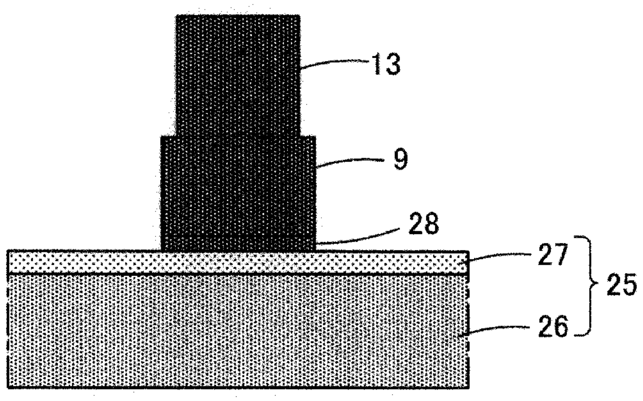
FIG. 11 is a sectional view illustrating a step subsequent to the step illustrated in FIG. 10, and illustrates a state in which an unnecessary portion of the seed layer is removed in a portion corresponding to the portion illustrated in FIG. 2A.

Next, wet etching is performed in the state illustrated in FIG. 10 to remove an unnecessary portion of the seed layer 28, that is, a portion exposed from the inductor wiring conductor 9, as illustrated in FIG. 11.

Figure 12:
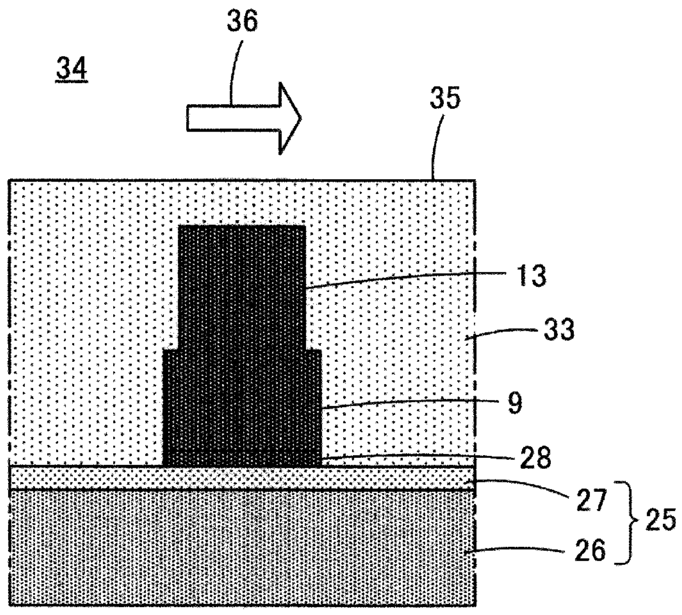
FIG. 12 is a sectional view illustrating a step subsequent to the step illustrated in FIG. 11, and illustrates a state in which a first magnetic layer is provided so as to incorporate an inductor wiring conductor and an extended conductor 1 in a portion corresponding to the portion illustrated in FIG. 2A.

Next, as illustrated in FIG. 12, a first magnetic layer 33, which is a part of the main body 2, is provided on the support substrate 25 so that the inductor wiring conductor 9 and the extended conductor 13 are positioned inside. The first magnetic layer 33 is formed, for example, by pressing a sheet made of an organic material containing metal magnetic powder to obtain a structure 34 illustrated in FIG. 12, and then curing the structure 34. That is, as described above, the structure 34 is prepared which has a main surface 35 serving as an upper surface of the first magnetic layer 33, and inside which the inductor wiring conductor 9 and the extended conductor 13 electrically connected to the inductor wiring conductor 9 are arranged, the extended conductor 13 extending toward the main surface 35.

Next, in the structure 34 illustrated in FIG. 12, a step of grinding the structure 34 from the main surface 35 side is performed so that the end surface of the extended conductor 13 is exposed to the main surface 35 side corresponding to the first main surface 3 illustrated in FIG. 2. This grinding step is preferably carried out in such a way that a grinding operation is applied to the main surface 35 only in the direction indicated by an arrow 36. However, the grinding operation may be an operation of grinding of only one direction on the end surface of the extended conductor 13, and the main surface 35 may be rotationally polished as the grinding operation.

Figure 13:
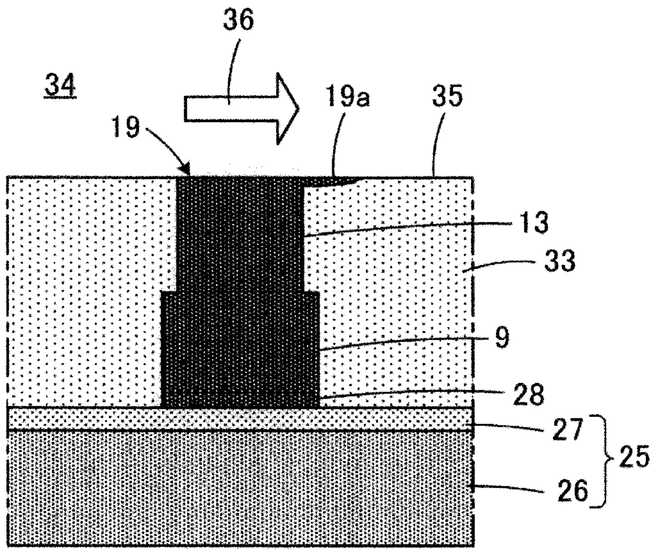
FIG. 13 is a sectional view illustrating a step subsequent to the step illustrated in FIG. 12, and illustrates a state in which, in a portion corresponding to the portion illustrated in FIG. 2A, the first magnetic layer is ground to expose an end surface of the extended conductor and an extending portion continuous with the end surface of the extended conductor is formed along and on the main surface of a structure.

At the time of the grinding, as illustrated in FIG. 13, the end surface of the extended conductor 13 serving as a part of the external terminal electrode 19 is exposed, and a part of the extended conductor 13 is extended to thereby form the extending portion 19*a* that is integrally formed with the end surface of the extended conductor 13 and extends along the main surface 35 after grinding.

In the above-described grinding step, at least two stages of grinding step such as a first grinding step and a subsequent second grinding step may be performed. In this case, in the second grinding step, abrasive grains smaller than those used in the first grinding step are used. That is, in the grinding, first abrasive grains and second abrasive grains smaller than the first abrasive grains are used, and after grinding with the first abrasive grains, grinding with the second abrasive grains is performed. According to this configuration, most of the extending portion 19*a* can be efficiently manufactured in the first grinding step, and then fine adjustment of the overhang dimension of the extending portion 19*a* can be performed in the second grinding step. Therefore, the extending portion 19*a* can be manufactured with high dimensional accuracy.

Figure 14:
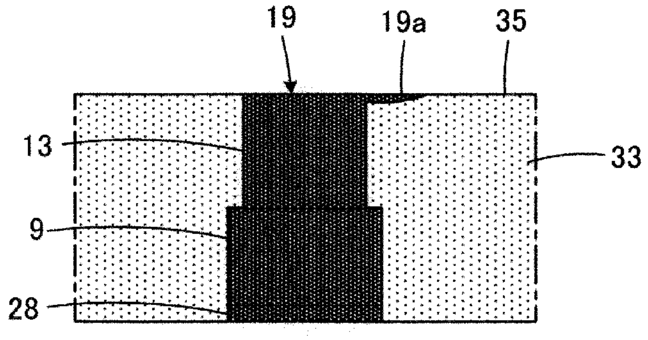
FIG. 14 is a sectional view illustrating a step subsequent to the step illustrated in FIG. 13, and illustrates a state in which the support substrate is removed in a portion corresponding to the portion illustrated in FIG. 2A.

Next, as illustrated in FIG. 14, the support substrate 25 is removed.

Figure 15:
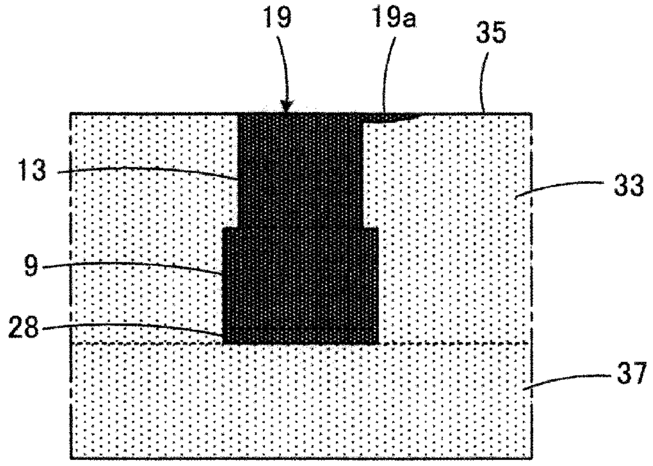
FIG. 15 is a sectional view illustrating a step subsequent to the step illustrated in FIG. 14, and illustrates a state in which a second magnetic layer is provided so as to be in contact with the first magnetic layer in a portion corresponding to the portion illustrated in FIG. 2A.

Next, as illustrated in FIG. 15, a second magnetic layer 37 is provided so as to be in contact with the first magnetic layer 33. The second magnetic layer 37 is formed, for example, by pressing a sheet made of an organic material containing metal magnetic powder to obtain the state illustrated in FIG. 15 and then curing the sheet. The second magnetic layer 37 and the above-described first magnetic layer 33 configure the main body 2.

Figure 2A:
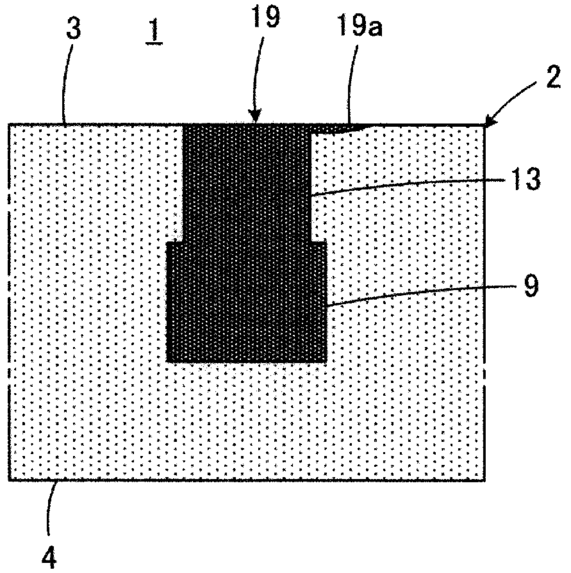
FIGS. 2A and 2B are an enlarged sectional view illustrating a part of the coil component illustrated in FIG. 1.
Figure 2B:
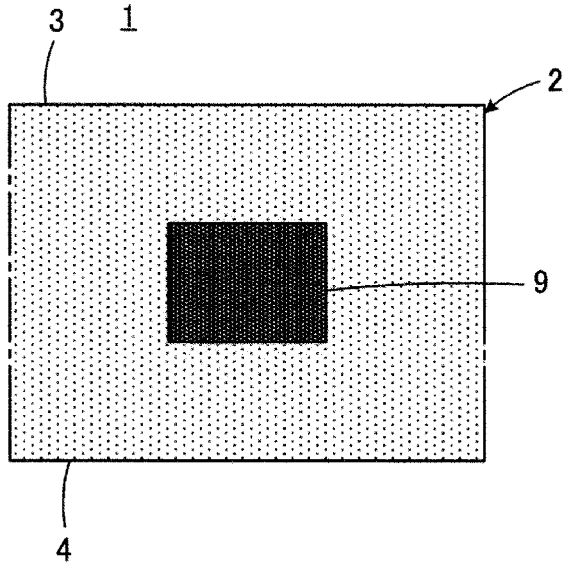

The state illustrated in FIG. 15 corresponds to the state illustrated in FIG. 2A.

The coil component 1 is manufactured in this manner, however, in a case where a plurality of the coil components 1 is simultaneously manufactured by the above-described steps, that is, being manufactured in a mother state, a step of cutting an assembly of the coil components 1 in the mother state by, for example, a dicer is performed thereafter.

Second Embodiment

Figure 16:
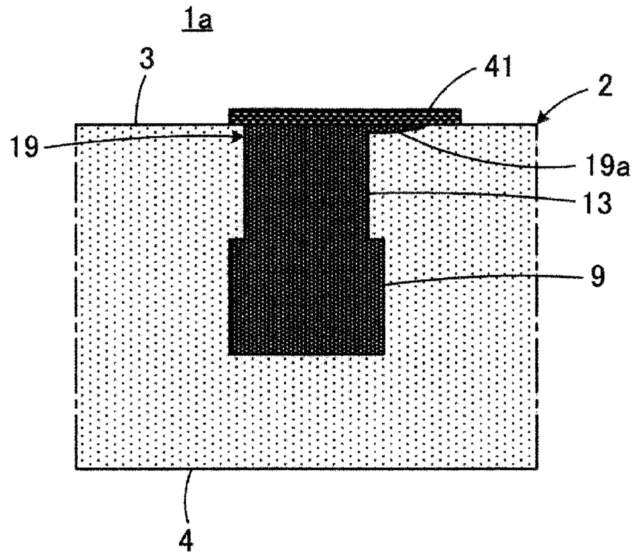
FIG. 16 is a sectional view illustrating a coil component.

FIG. 16 is a view corresponding to FIG. 2A and illustrating a coil component 1*a* according to a second embodiment of the present disclosure. In FIG. 16, elements corresponding to those illustrated in FIG. 2A are denoted by the same reference numerals, and overlapping description will be omitted.

Referring to FIG. 16, the second embodiment is characterized by further including a plating film 41 that covers the external terminal electrode 19 including the end surface of the extended conductor 13 and the extending portion 19*a*. When viewed from a direction orthogonal to the main surface 3, the plating film 41 is formed so as to cover at least the end surface of the extended conductor 13 exposed on the main surface 3 and the extending portion extending along the main surface 3. Thus, the plating film 41 has a section larger than the section of the extended conductor 13 when viewed in a section extending in a direction parallel to the first main surface 3. Note that in the second embodiment, the plating film 41 has a larger area than the external terminal electrode 19. The plating film 41 includes, for example, a Cu electroless plating layer as a base layer, an Ni electrolytic plating layer thereon, and an Au electrolytic plating layer thereon.

Third Embodiment

Figure 17:
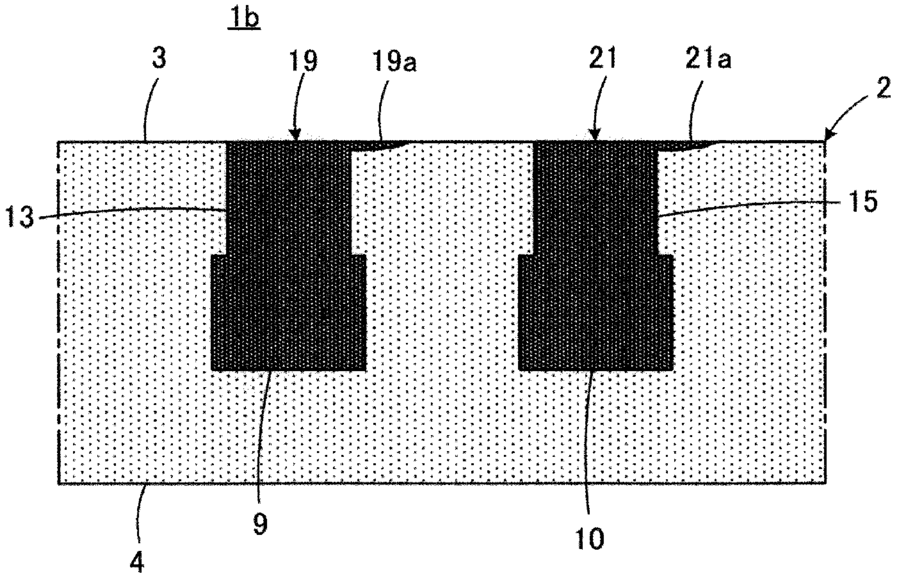
FIG. 17 is a sectional view illustrating a coil component.

FIG. 17 is a view corresponding to FIG. 2A and illustrates a coil component 1*b* according to a third embodiment of the present disclosure. In FIG. 17, elements corresponding to those illustrated in FIG. 2A or FIG. 1 are denoted by the same reference numerals, and overlapping description will be omitted.

Referring to FIG. 17, for example, the external terminal electrodes 19 and 21 including end surfaces of the two extended conductors 13 and 15 and the extending portions 19*a* and 21*a* are arranged along the first main surface 3, respectively. Here, the interval between the two external terminal electrodes 19 and 21 is relatively narrow. In such a case, the extending portions 19*a* and 21*a* of the two external terminal electrodes 19 and 21 preferably overhang in the same direction to each other.

By adopting such a configuration, even when the interval between the different external terminal electrodes 19 and 21 is narrowed, it is possible to make it difficult for an undesirable electrical short circuit to occur between the external terminal electrodes 19 and 21.

Fourth Embodiment

Figure 18:
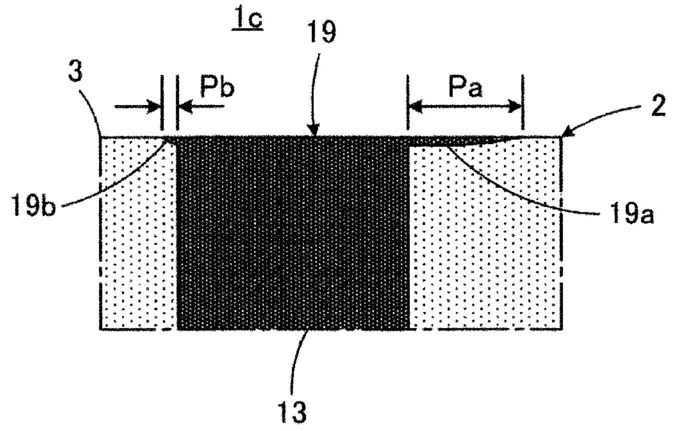
FIG. 18 is a sectional view illustrating a coil component.

FIG. 18 is a view corresponding to a part of FIG. 2A and illustrates a coil component 1*c* according to a fourth embodiment of the present disclosure. In FIG. 18, elements corresponding to those illustrated in FIG. 2A are denoted by the same reference numerals, and overlapping description will be omitted.

Referring to FIG. 18, the extended conductor 13 includes an end surface, the extending portion 19*a*, and an extending portion 19*b*, and the external terminal electrode 19 including the end surface, the extending portion 19*a*, and the extending portion 19*b* is formed. According to the grinding process illustrated in FIG. 12 and FIG. 13 described above, not only is the extending portion 19*a* formed, but also an extending portion 19*b* located in a direction different from the direction in which the extending portion 19*a* is located is formed. An overhang dimension Pb of the extending portion 19*b* is smaller than an overhang dimension Pa of the extending portion 19*a*.

Even in such a case, when the configuration of the third embodiment described above is adopted, it is possible to make the problem of undesirable electrical short circuit less likely to occur. That is, like the extending portion 19*a* of the external terminal electrode 19, when the extending portions of the plurality of external terminal electrodes having larger overhang dimensions are made to overhang in the same direction to each other, the problem of undesirable electrical short circuit can be made less likely to occur.

Although this disclosure has been described with reference to several embodiments illustrated in the drawings, various other modifications are possible within the scope of this disclosure.

For example, although the sectional shape of each of the extended conductors 13 to 18 is illustrated as a quadrangular shape, the sectional shape is not limited thereto and may be a circular shape, for example.

In addition, the shape, number, and the like of the inductor wiring conductor in the coil component can be arbitrarily changed according to design. The inductor wiring conductor may extend in a spiral shape, for example.

In addition, a method of forming the inductor wiring conductor and the extended conductor is not limited, and an electroless plating method, a sputtering method, a vapor deposition method, a printing method, or the like may be applied in addition to the electrolytic plating method described above.

In addition, each embodiment described in this specification is an example, and it is possible to partially replace or combine configurations between different embodiments.

What is claimed is:

1. A coil component comprising:

a main body having a main surface;

an inductor wiring conductor arranged in the main body and extending in a length direction of the inductor wiring conductor; and an extended conductor arranged in the main body so as to extend toward the main surface and electrically connected to the inductor wiring conductor;

wherein the extended conductor includes an end surface exposed on the main surface, and an extending portion that is integrally configured with the end surface and is arranged so as to extend along and on the main surface, the extending portion extending past the end surface of the extended conductor in a width direction of the inductor wiring conductor which is orthogonal to the length direction of the inductor wiring conductor without extending past the end surface of the extended conductor along the length direction of the inductor wiring conductor.

2. The coil component according to claim 1, further comprising:

a second extended conductor arranged in the main body so as to extend toward the main surface and electrically connected to the inductor wiring conductor, wherein the second extended conductor includes a second end surface exposed on the main surface and a second extending portion integrally configured with the second end surface and arranged so as to extend along and on the main surface, and the extending portion and the second extending portion are located in the same direction to each other with respect to the end surface and the second end surface, respectively.

3. The coil component according to claim 1, further comprising:

a second inductor wiring conductor arranged in the main body; and a third extended conductor arranged in the main body so as to extend toward the main surface and electrically connected to the second inductor wiring conductor;

wherein the third extended conductor includes a third end surface exposed on the main surface, and a third extending portion integrally configured with the third end surface and arranged so as to extend along and on the main surface, and the extending portion and the third extending portion are located in the same direction to each other with respect to the end surface and the third end surface, respectively.

4. The coil component according to claim 1, wherein the extended conductor is made of copper or a copper alloy.

5. The coil component according to claim 1, wherein the main body includes a magnetic material.

6. The coil component according to claim 1, further comprising:

a plating film that covers the end surface and the extending portion.

7. The coil component according to claim 1, wherein the inductor wiring conductor extends in a length direction of the inductor wiring conductor, and a depth of the extending portion in the main body decreases toward the main surface from an end of the extending portion at the extended conductor toward a free end of the extending portion along a width direction of the inductor wiring which is orthogonal to the length direction of the inductor wiring.

8. The coil component according to claim 1, wherein the extended conductor is arranged so as to extend in a direction orthogonal to the main surface.

9. The coil component according to claim 8, wherein the extending portion is located only on one side of the end surface when viewed from a direction orthogonal to the main surface.

10. The coil component according to claim 8, further comprising:

a second extended conductor arranged in the main body so as to extend toward the main surface and electrically connected to the inductor wiring conductor, wherein the second extended conductor includes a second end surface exposed on the main surface and a second extending portion integrally configured with the second end surface and arranged so as to extend along and on the main surface, and the extending portion and the second extending portion are located in the same direction to each other with respect to the end surface and the second end surface, respectively.

11. The coil component according to claim 8, further comprising:

a second inductor wiring conductor arranged in the main body; and a third extended conductor arranged in the main body so as to extend toward the main surface and electrically connected to the second inductor wiring conductor;

wherein the third extended conductor includes a third end surface exposed on the main surface, and a third extending portion integrally configured with the third end surface and arranged so as to extend along and on the main surface, and the extending portion and the third extending portion are located in the same direction to each other with respect to the end surface and the third end surface, respectively.

12. The coil component according to claim 8, wherein the extended conductor is made of copper or a copper alloy.

13. The coil component according to claim 8, wherein the main body includes a magnetic material.

14. The coil component according to claim 8, further comprising:

a plating film that covers the end surface and the extending portion.

15. The coil component according to claim 1, wherein the extending portion is located only on one side of the end surface when viewed from a direction orthogonal to the main surface.

16. The coil component according to claim 15, further comprising:

a second extended conductor arranged in the main body so as to extend toward the main surface and electrically connected to the inductor wiring conductor, wherein the second extended conductor includes a second end surface exposed on the main surface and a second extending portion integrally configured with the second end surface and arranged so as to extend along and on the main surface, and the extending portion and the second extending portion are located in the same direction to each other with respect to the end surface and the second end surface, respectively.

17. The coil component according to claim 15, further comprising:

a second inductor wiring conductor arranged in the main body; and a third extended conductor arranged in the main body so as to extend toward the main surface and electrically connected to the second inductor wiring conductor;

wherein the third extended conductor includes a third end surface exposed on the main surface, and a third extending portion integrally configured with the third end surface and arranged so as to extend along and on the main surface, and the extending portion and the third extending portion are located in the same direction to each other with respect to the end surface and the third end surface, respectively.

18. A coil component comprising:

a main body having a main surface;

an inductor wiring conductor arranged in the main body and extending in a length direction of the inductor wiring conductor; and an extended conductor arranged in the main body so as to extend toward the main surface and electrically connected to the inductor wiring conductor;

wherein the extended conductor includes an end surface exposed on the main surface, and an extending portion that is integrally configured with the end surface and is arranged so as to extend along and on the main surface, and a depth of the extending portion in the main body decreases toward the main surface from an end of the extending portion at the extended conductor toward a free end of the extending portion along a width direction of the inductor wiring which is orthogonal to the length direction of the inductor wiring.

* * * * *